United States Patent
Hockaday (10) Patent No.: US 9,766,156 B2
(45) Date of Patent: Sep. 19, 2017

(54) FOCUSED OPTICAL CONFIGURATION FOR NSMS PROBES

(71) Applicant: UNITED TECHNOLOGIES CORPORATION, Farmington, CT (US)

(72) Inventor: Bruce Hockaday, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 14/774,574

(22) PCT Filed: Dec. 18, 2013

(86) PCT No.: PCT/US2013/076104
§ 371 (c)(1),
(2) Date: Sep. 10, 2015

(87) PCT Pub. No.: WO2014/143295
PCT Pub. Date: Sep. 18, 2014

(65) Prior Publication Data
US 2016/0033358 A1   Feb. 4, 2016

Related U.S. Application Data

(60) Provisional application No. 61/903,212, filed on Nov. 12, 2013, provisional application No. 61/794,533, filed on Mar. 15, 2013.

(51) Int. Cl.
*G01B 11/16* (2006.01)
*G01M 11/08* (2006.01)
(Continued)

(52) U.S. Cl.
CPC ......... *G01M 11/083* (2013.01); *F01D 21/003* (2013.01); *G01M 11/081* (2013.01); *G01M 15/14* (2013.01); *F05D 2270/804* (2013.01)

(58) Field of Classification Search
CPC ....... G01B 11/16; G01B 11/165; G01B 11/18; G01L 1/24; G01M 11/086
(Continued)

(56) References Cited

U.S. PATENT DOCUMENTS 5,201,227 A    4/1993   Iinuma et al.
5,557,099 A    9/1996   Zielinski et al.
(Continued)

FOREIGN PATENT DOCUMENTS

EP    1546683 B1    11/2011

OTHER PUBLICATIONS

International Search Report for related International Application No. PCT/US2013/076104; reported on Apr. 14, 2014.
(Continued)

*Primary Examiner* — Tarifur Chowdhury
*Assistant Examiner* — Md M Rahman
(74) *Attorney, Agent, or Firm* — Cantor Colburn LLP (57) ABSTRACT

A method for configuring a sensor of a non-interference stress management system is disclosed. The method may include determining a focal distance between a light transmitting fiber and a transmit lens, the focal distance configured to focus light from the transmit fiber to form a focused transmit beam, the transmit beam targeting a reflective structure. The method may further include positioning the light transmitting fiber and the transmit lens, wherein the light transmitting fiber and the transmit lens are separated by a transmit gap based on the focal distance and positioning a light receptive fiber and a receive lens to receive a focused reflected beam from the reflective structure, wherein the light receptive fiber is separated from the receive lens by a receive gap based on the focal distance.

12 Claims, 6 Drawing Sheets (51) Int. Cl.
*G01M 15/14* (2006.01)
*F01D 21/00* (2006.01)

(58) Field of Classification Search
USPC .......................................... 356/32
See application file for complete search history.

(56) References Cited

U.S. PATENT DOCUMENTS

| | | | |
|---|---|---|---|
| 5,818,996 A * | 10/1998 | Doyle | G02B 6/241 385/115 |
| 6,370,299 B1 * | 4/2002 | Green | G02B 6/4206 372/101 |
| 6,717,172 B2 | 4/2004 | Gharib et al. | |
| 7,984,656 B2 | 7/2011 | Nicklous et al. | |
| 2004/0061954 A1 * | 4/2004 | Ludington | G02B 6/32 359/793 |
| 2006/0145066 A1 | 7/2006 | Tamiya | |
| 2008/0130014 A1 * | 6/2008 | Rush | G01B 11/0608 356/609 |
| 2008/0297808 A1 | 12/2008 | Riza et al. | |
| 2010/0018321 A1 | 1/2010 | Nicklous et al. | |
| 2010/0074727 A1 | 3/2010 | Twerdochlib | |

OTHER PUBLICATIONS

European Search Report for application EP 13878162.0, dated Oct. 7, 2016, 14 pages.
Jones, H., "Shedding Light on Vibration", Mechanical Engineering, ASME, New York, U.S., vol. 1, No. 11, Nov. 1, 1996, pp. 94-97.

\* cited by examiner

FOCUSED OPTICAL CONFIGURATION FOR NSMS PROBES

CROSS-REFERENCE TO RELATED APPLICATIONS

This patent application is a 35 USC §371 U.S. national stage filing of International Patent Application No. PCT/US13/76104 filed on Dec. 18, 2013, which claims priority under the 35 USC §119(e) to U.S. Provisional Patent Application Ser. Nos. 61/903,212 filed on Nov. 12, 2013 and 61/794,533, filed on Mar. 15, 2013.

TECHNICAL FIELD OF THE DISCLOSURE

The present disclosure relates to non-interference stress measurement systems (NSMS) and, more specifically, to NSMSs used to monitor structural data in gas turbine engines.

BACKGROUND OF THE DISCLOSURE

Non-interference stress measurement systems (NSMSs) may be designed for collecting structural data associated with gas turbine engine components (e.g., using rotating airfoil vibration measurements correlated to airfoil stress). For example, the measured structural data may be used for engine design purposes, for engine certification processes, and/or for engine monitoring. NSMSs may utilize optical sensors to collect said structural data in engine components. Once collected, the structural data may be relayed to ground-based and/or in-flight electronics that process the data. Early NSMSs utilized large component cabinets located on the ground and linked to sensors on a test engine through fiber optic cable; however, current NSMSs have been designed with smaller components and may be integrated within the engine itself.

Further, in some circumstances it is desirable or necessary to collect in-flight engine structural data while an engine is mounted to an airframe. To implement NSMSs in-flight, improvements upon known NSMSs have been made to lessen the weight and mounting restrictions of previous models. Known NSMS implementations for collecting structural data about gas turbine engine components have been modified for use in-flight by using microcontrollers and smaller lasers mounted to components of the gas turbine engine. Known in-flight NSMSs can allow for automated NSMS data collection during operation, rather than the prior one-time, operator induced NSMS collection systems. Such examples are further detailed in U.S. Pat. No. 7,984,656 ("NSMS Flight Laser Detector System").

When using an NSMS, the NSMS probes and NSMS probe configurations may not always provide accurate data. At times, the received data may be blurry, unclear, and/or imprecise; potential errors in calculations and analyses may be drawn from the blurry, unclear, and/or imprecise data. At times, the data may be so corrupted that it cannot be used at all.

One major cause of such data corruption may be the intensity of light that the optical fibers transmit and receive. Past designs may have used a collimated light setup, wherein optical transmit and receive fibers are positioned directly against the respective transmit and receive lenses. Such designs create an unfocused light beam down the center of the transmission lens; such unfocused light beams may cause reflections of unwanted light at various angles when the beam is directed at a target. A receiving lens in the NSMS sensor may receive such unwanted, reflected light, causing corruption in data derived from the reflected light. Because accuracy of the structural data collected by the NSMS is imperative, it can be seen that an improvement is needed to focus the light being transmitted from transmit fiber and optimize the reception apparatus for optimum light intensity for reception by receive sensors.

SUMMARY OF THE DISCLOSURE

In accordance with one aspect of the disclosure, a method for configuring a sensor of a non-interference stress management system is disclosed. The method may include determining a focal distance between a light transmitting fiber and a transmit lens, wherein the focal distance is configured to focus light from the transmit fiber to form a focused transmit beam, the transmit beam targeting a reflective structure. The method may further include positioning the light transmitting fiber and the transmit lens wherein the light transmitting fiber and the transmit lens are separated by a transmit gap based on the focal distance and positioning a light receptive fiber and a receive lens to receive a focused reflected beam from the reflective structure, wherein the light receptive fiber is separated from the receive lens by a receive gap based on the focal distance.

In a refinement, the method may further include adjusting the transmit gap to account for tolerances associated with the structure.

In a refinement, the method may further include adjusting the receive gap to account for tolerances associated with the structure.

In a refinement, the method may further include setting a placeholder between the light transmitting fiber and the transmit lens to create the transmit gap.

In a further refinement, the method may further include securing the transmit gap using an adhesive and removing the placeholder once the adhesive is set.

In a refinement, the method may further include setting a washer between the light transmitting fiber and the transmit lens to create the transmit gap.

In a refinement, the reflective structure may be a rotating airfoil.

In a further refinement, the reflective structure may be one of a fan blade, a compressor blade, or a turbine blade.

In accordance with another aspect of the disclosure, a sensor for a non-interference stress management system is disclosed. The sensor may include a light transmitting fiber and a transmit lens, the transmit lens focusing light from the transmit fiber to form a focused transmit beam, the transmit beam targeting a reflective structure, wherein the light transmitting fiber and the transmit lens are separated by a transmit gap based on a focal distance configured to produce the transmit beam. The sensor may further include a light receptive fiber and a receive lens, the receive lens and light receptive fiber being separated by a receive gap based on the focal distance to receive a reflected beam from the reflective structure.

In a refinement, the receive gap may be created using a placeholder set between the light receptive fiber and the receive lens.

In a further refinement, the receive gap may be secured using an adhesive and the placeholder may be removed once the adhesive is set.

In a refinement, the transmit lens is a quarter-pitch lens.

In a refinement, the receive lens is a quarter-pitch lens.

In a refinement, the receive gap is created using a washer set between the light receptive fiber and the receive lens.

In another aspect of the disclosure, a method for monitoring structural data associated with a reflective structure of a gas turbine engine, wherein the structure includes a reflective surface, is disclosed. The method may include positioning a sensor of a non-interference stress management system to monitor the structure, the sensor including a light transmitting fiber, a transmit lens, a light receptive fiber, and a receive lens. The method may further include determining a focal distance between the light transmitting fiber and the transmit lens, wherein the focal distance is configured to focus light from the transmit fiber to form a focused transmit beam, the transmit beam targeting the reflective surface. The method may further include positioning the light transmitting fiber and the transmit lens wherein the light transmitting fiber and the transmit lens are separated by a transmit gap based on the focal distance and positioning a light receptive fiber and a receive lens to receive a focused reflected beam from the reflective structure, wherein the light receptive fiber is separated from the receive lens by a receive gap based on the focal distance.

In a refinement, the reflective structure is a rotating airfoil of the gas turbine engine.

In a refinement, the method may further include reporting the measured structural data to a local memory.

In a refinement, the method may further include reporting the measured structural data to a ground based memory.

In a refinement, the structural data may be monitored during a flight cycle.

In a refinement, the structural data may be monitored during a test cycle.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE DRAWINGS

Figure 1:
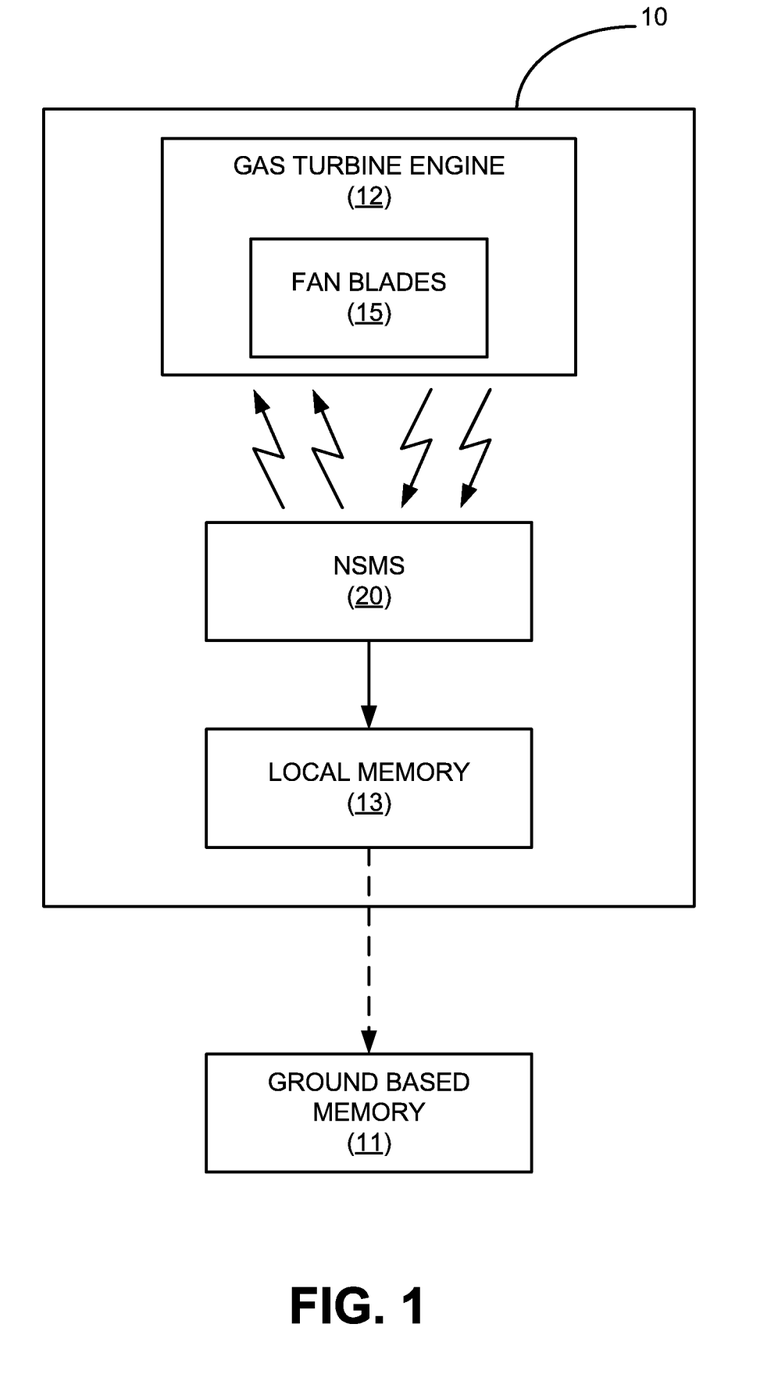
FIG. 1 is a block diagram for an exemplary system for collecting structural data related to a gas turbine engine.

Referring now to FIG. 1, a block diagram of an example airframe 10, which may carry a gas turbine engine 12, is shown. The gas turbine engine 12 may have a plurality of fan blades. Within the airframe, structural characteristics of the fan blades 15 may be monitored by a non-interference stress measurement system (NSMS) 20. The NSMS 20 may be configured to direct light towards the fan blades 15 and sense light reflected from the fan blades 15. In so doing, data associated with blade arrival events may be generated and stored. The data may include, but is not limited to including, time-stamps associated with blade arrival events. While the present embodiment shows an NSMS 20 for monitoring the airfoils of fan blades 15 of the gas turbine engine 10, the NSMS 20 is not limited to targeting and monitoring only the airfoils of fan blades 15. Any surface within the gas turbine engine having a reflective rotating airfoil surface may be monitored using the systems and methods of the disclosure. Example airfoils which may be monitored by the NSMS 20 may be, for example, compressor blades and/or turbine blades.

Figure 2:
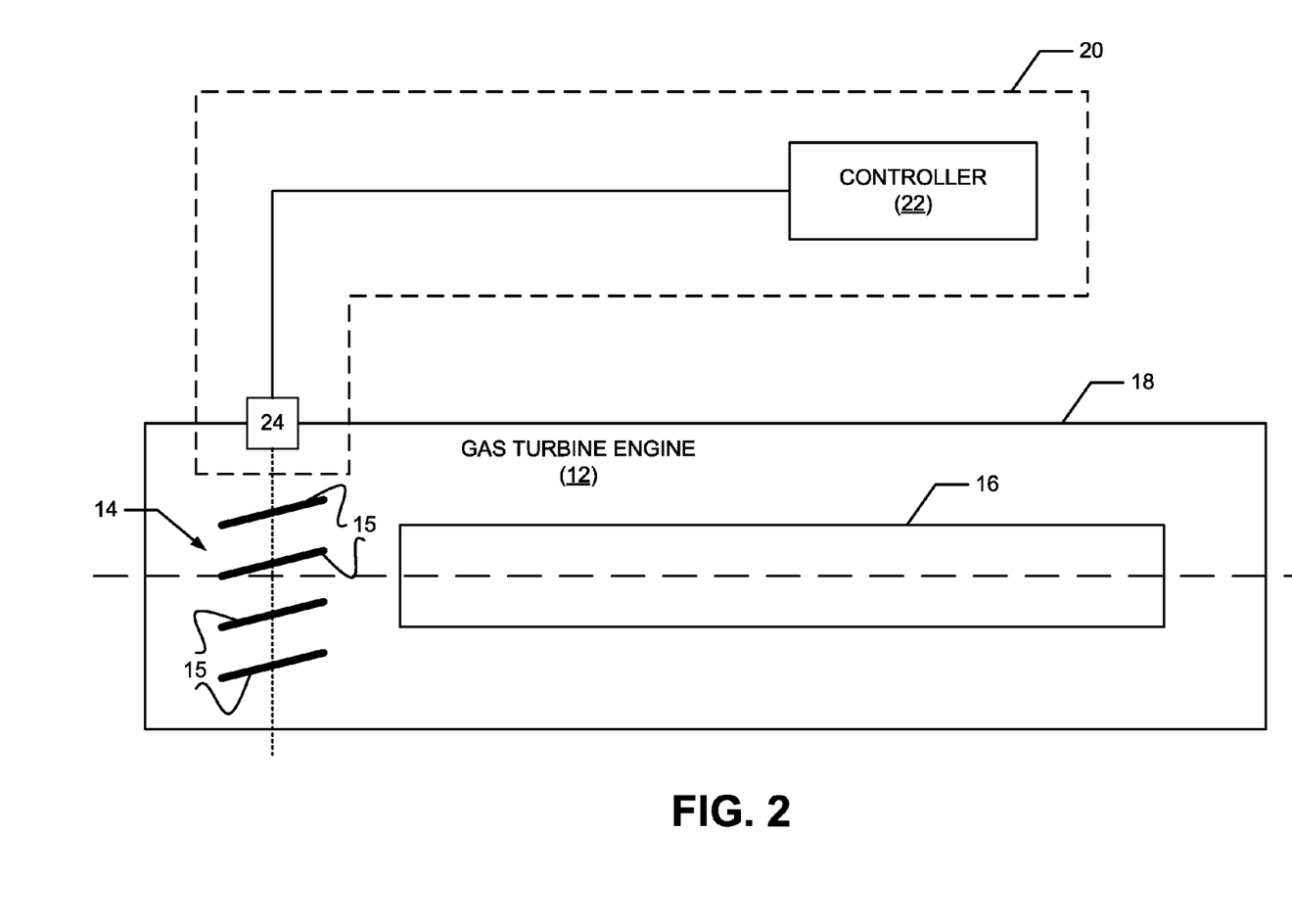
FIG. 2 is a schematic diagram of a non-intrusive stress measurement system (NSMS) operating to monitor a gas turbine engine.

Turning to FIG. 2, one example of the NSMS 20 used for collecting structural data associated with gas turbine engine components is shown. The NSMS 20 may include a controller 22 that is operatively associated with at least one sensor 24 installed in conjunction with a gas turbine engine 12. More specifically, the at least one sensor 24 may be fixedly disposed within an engine case 18 of the engine 12 and positioned in a manner which enables the sensor(s) 24 to detect the passing of fan blades 15 radially extending from the rotor 14 of the gas turbine engine 12. The sensors 24 may be implemented using one or more optical sensors capable of outputting a signal corresponding to the proximity of the fan blades 15 rotating relative thereto.

In the exemplary embodiment of FIG. 2, one or more of the sensors 24 of the NSMS 20 may employ optical means to detect the presence of a passing of a fan blade 15 relative to the sensor. More specifically, each sensor 24 may include transmission optics or an optic source configured to emit light towards the fan blades 15, or the tips thereof, as well as receive optics configured to detect any light that may be reflected by a rotor blade passing in proximity thereto. The sensors 24 may be further configured to discern the degree of proximity of each passing fan blade 15 based on the magnitude of light that is received and detected. For example, each sensor 24 may output a continuous analog voltage or current signal to the controller 22 which varies, such as in the form of the signal phase, amplitude and/or frequency, according to the amount of light that is detected. In turn, the controller 22 may compare these variations to predefined thresholds to determine the corresponding proximity of, or at least the presence of, each fan blade 15 as the rotor 14 rotates within the gas turbine engine 12.

Figure 3:
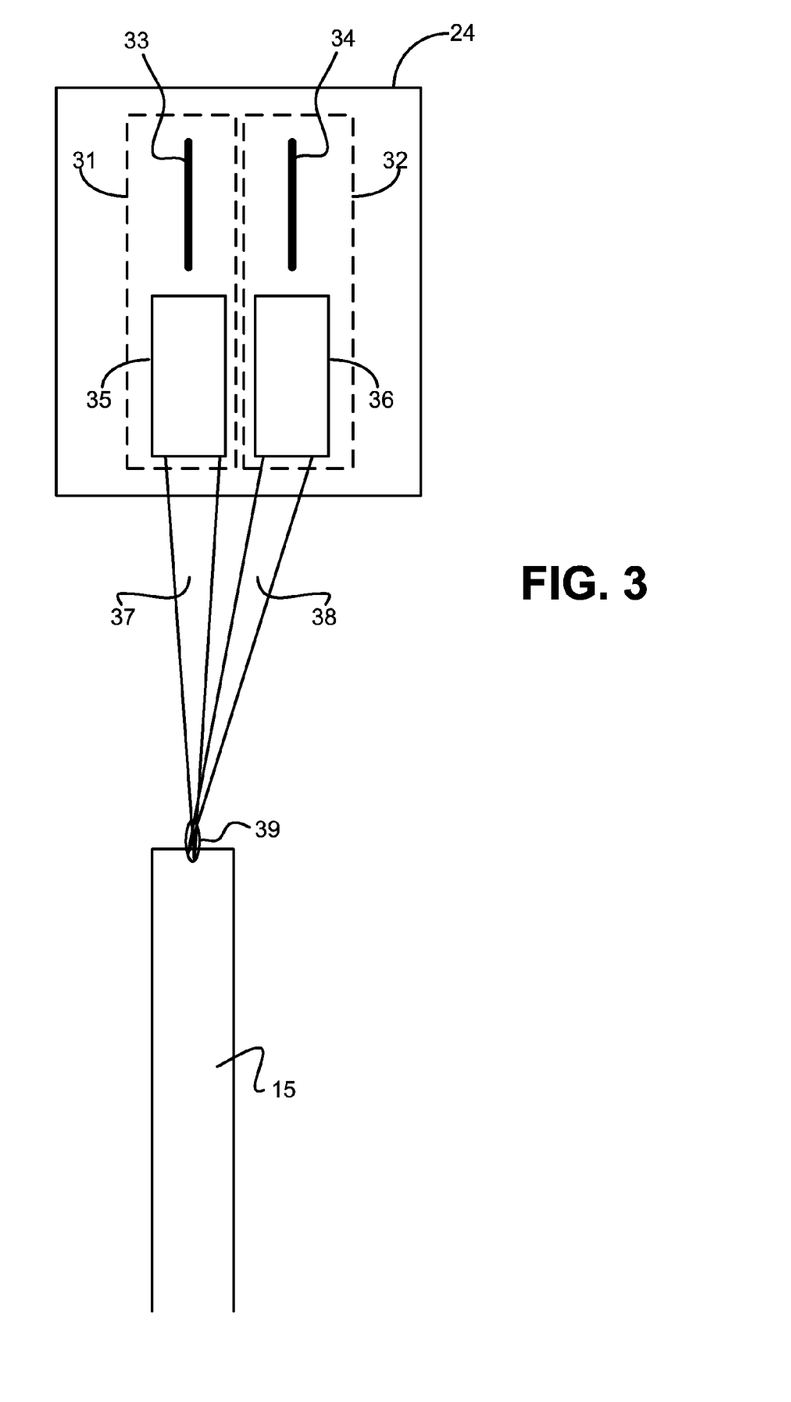
FIG. 3 is a schematic diagram of a sensor of an NSMS of FIG. 2, the sensor positioned to monitor a rotating airfoil of the gas turbine engine.
Figure 4:
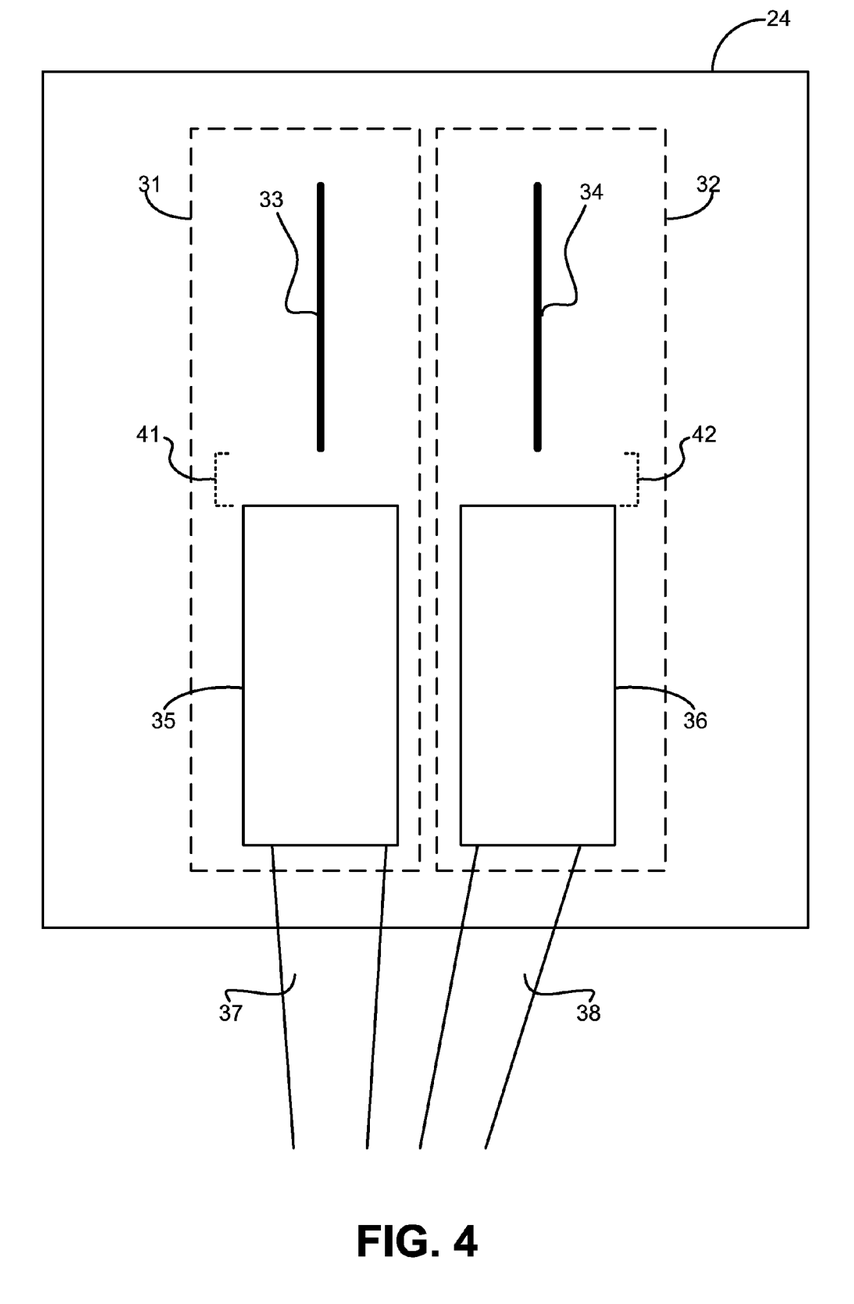
FIG. 4 is a magnified, schematic diagram of the sensor of FIG. 3.

With reference to FIGS. 3 and 4, an example sensor 24 in accordance with the present disclosure is shown. The sensor 24 may include transmit optics 31 and receive optics 32. To generate a transmit beam 37, the transmit optics 31 may employ a light transmitting fiber 33 and a transmit lens 35, the transmit lens 35 receiving light from the light transmitting fiber 33 and focusing the light to form the transmit beam 37. The transmit lens 35 may be any lens suitable for focusing light from the light transmitting fiber 33; for example, the transmit lens 35 may be a quarter-pitch lens. Further, the transmit beam 37 may be directed at a target location 39 of the fan blade 15 and may be configured to focus the emitted light of the transmit beam 37 on the target location 39.

As seen in FIG. 4, the light transmitting fiber 33 and transmit lens 35 may be separated by a transmit gap 41. The transmit gap 41 may be based on a focal distance, the focal distance configured to focus the transmit beam 37 on the target 39. The transmit gap 41 may be adjusted based upon an optical focus distance (e.g., the distance between the transmit lens 35 and the target 39), wherein the optical focus distance of the transmit beam 37 decreases as the length of the transmit gap 41 increases.

Returning to the receive optics 32 of the sensor 24 as shown in FIGS. 3 and 4, the light receptive fiber 34 and the receive lens 34 are configured to receive a focused reflected beam 38. The focused reflected light beam 38 may be any reflected light from the transmit beam 37, the light being reflected by the fan blade 15 at the target 39. The transmit lens 35 may be any lens suitable for focusing light from the light transmitting fiber 33; for example, the transmit lens 35 may be a quarter-pitch lens.

In FIG. 4, a receive gap 42 is shown between the light receptive fiber 34 and the receive lens 36. The receive gap 42 may be based on a reception focal distance determined to properly receive the reflected light beam 38. This reception focal distance may be based on the focal distance used to set the transmit gap 41. The receive gap 42 may be adjusted based upon an optical focus distance (e.g., the distance between the receive lens 36 and the target 39) associated with the reflected light beam 38.

Once the transmit gap 41 and receive gap 42 are initially configured based on the focal distance(s), both gaps may be adjusted based on tolerances associated with the blade 15, the gas turbine engine 12, and/or any other source of error associated with the gas turbine engine 12 or the sensor 24 itself. Once the transmit gap 41 is determined, components of the transmit optics 31 may be positioned as shown. Components of the transmit optics may be held in place using a placeholder, such as, for example, temporary shims and/or temporary wires. After said placement is properly configured based on the transmit gap 41, the components of the transmit optics 31 may be held in place with an adhesive and the placeholder may be removed. Additionally or alternatively, the transmit gap 41 may be maintained by setting a washer between the light transmitting fiber 33 and the transmit lens 35.

Similarly, after the receive gap 42 is determined, components of the receive optics 32 may be positioned as shown. Components of the transmit optics may be held in place using a placeholder, such as, for example, temporary shims and/or temporary wires. After said placement is properly configured based on the receive gap 42, the components of the receive optics 32 may be held in place with an adhesive and the placeholder may be removed. Additionally or alternatively, the receive gap 42 may be maintained by setting a washer set between the light receptive fiber 34 and the receive lens 36.

The sensor 24 may record timestamp data based upon the time of transmission of the transmit beam 37 and/or timestamp data based upon the time of reception of the reflected light beam 38. The timestamp data may be transmitted to and/or processed by elements in operative association with the sensor 24 such as, for example, the controller 22 of FIG. 2.

Figure 5:
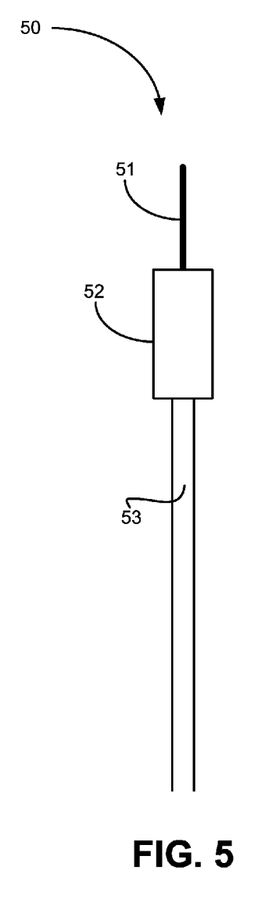
FIG. 5 is a schematic diagram of an optical fiber and optical lens configuration, the configuration being a collimated configuration.

Using such configurations to create a focused transmission and a focused reception of the light of an NSMS may increase the accuracy of the NSMS by reducing the improperly reflected light which may cause errors. A collimated arrangement of light optics 50, as seen in FIG. 5, wherein the fiber 51 is positioned up against the lens 52, may create a large beam 53. A large, unfocused beam, like beam 53, may cause excess light to reflect in unwanted ways, which may include reflecting unwanted light towards or away from a receptor associated with the transmitter.

Figures 6, 7:
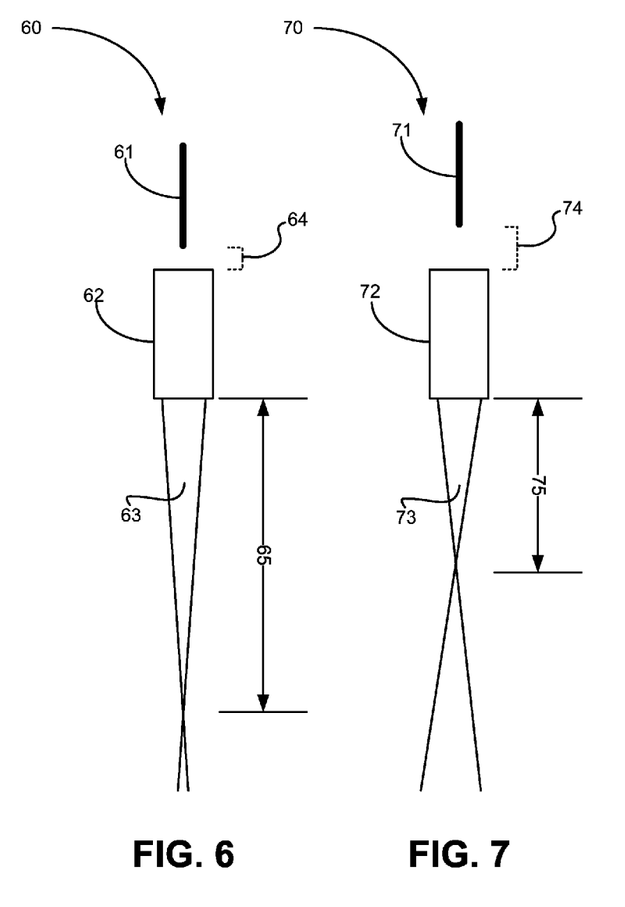
FIG. 6 is a schematic diagram of a first focused optical fiber and optical lens configuration, the configuration being a focused configuration based on a focal distance between the fiber and lens.
FIG. 7 is a schematic diagram of a second focused optical fiber and optical lens configuration, the configuration being a focused configuration based on a focal distance between the fiber and lens.

To reduce the interference and associated error caused by collimated probe arrangements, a focused probe arrangement (e.g., the arrangement between the lenses and fibers of FIGS. 3 and 4) may reduce the interference and error when compared to collimated probe arrangements. For example, FIG. 6 shows a focused probe arrangement 60, wherein the fiber 61 and the lens 62 are separated by a gap 64. The gap 64 is calibrated to create a focused beam 63 having a focal length 65. In another example focused probe arrangement 70 shown in FIG. 7, the probe arrangement has a gap 74; the gap 74 is of greater length then the gap 64 of FIG. 6. As such, the greater gap 74 produces a shorter focal length 75 for the beam 73 than that of the focal length 65 for the beam 63. It can be seen that the focus of the beam in such an arrangement may be calibrated using these principles regarding the focal length's association with the gap.

As described with reference to the sensor 24 of FIGS. 3 and 4, the receive optics 32 may be similarly calibrated to receive a reflected beam, wherein the source of the reflected beam is a focused beam. Using a focused configuration for receive optics associated with a focused configuration for transmit optics will create a focused/focused optical configuration for the sensor 24 of the NSMS 20.

Figure 8:
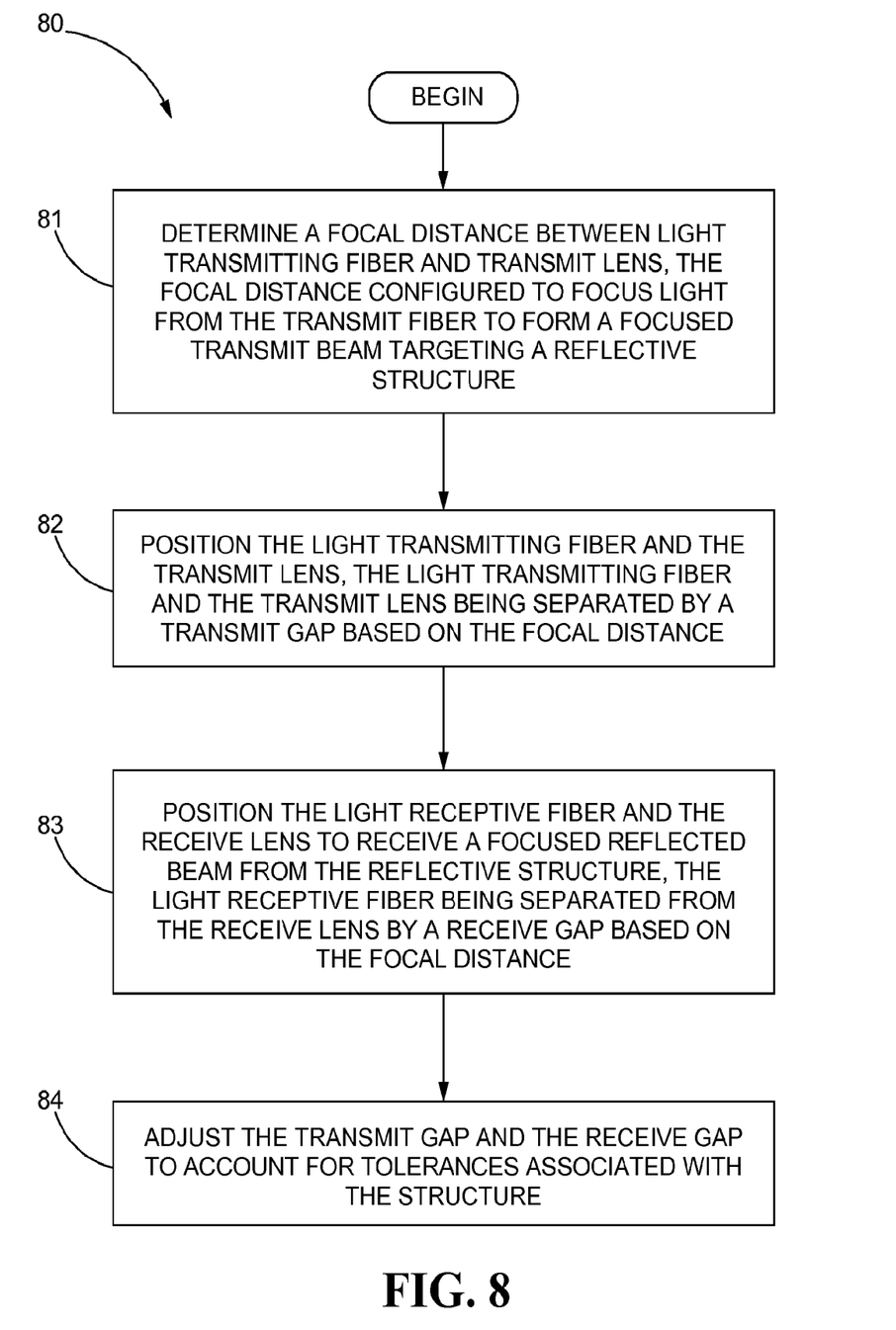
FIG. 8 is flow chart representative of a method for configuring a sensor of a non-interference stress management system.

Turning now to FIG. 8, and with continued reference to FIGS. 1-4, a method 80 for configuring a sensor 24 of a NSMS 20 is shown. At block 81, the method 80 may determine a focal distance between the light transmitting fiber 33 and the transmit lens 35, wherein the focal distance is configured to focus light from the transmit fiber 33 to form a focused transmit beam 37 targeting a reflective structure, such as the fan blade 15. The method 80 may position the light transmitting fiber 31 and the transmit lens 35, wherein the light transmitting fiber 31 and the transmit lens 35 are separated by a transmit gap 41 based on the focal distance (block 82).

Further, at block 83, the method may position the light receptive fiber 32 and the receive lens 36 to receive a focused reflected beam 38 from the reflective structure (e.g., a fan blade 15), wherein the light receptive fiber 34 is separated from the receive lens 36 by a receive gap 42 based on the focal distance. The transmit gap 41 and receive gap 42 may be adjusted to account for tolerances associated with the structure (block 84).

INDUSTRIAL APPLICABILITY

From the foregoing, it can be seen that the technology disclosed herein has industrial applicability in a variety of settings such as, but not limited to, systems and methods for calibrating a sensor associated with an NSMS. The NSMS may be used in conjunction with a gas turbine engine for measuring structural data associated with the gas turbine engine. Using the teachings of the present disclosure, NSMSs may be produced having a focused/focused probe configuration. This improvement over the prior art may improve the accuracy of data produced by the NSMS by reducing unwanted reflected light and thereby reducing potential signal error.

While the present disclosure has been in reference to an NSMS for a gas turbine engine, one skilled in the art will understand that the teachings herein can be used in other applications as well. For example, the disclosed systems and methods for calibrating NSMS probes may be used in the scope of monitoring data associated with any other rotational structure that require structural monitoring. It is therefore intended that the scope of the invention not be limited by the embodiments presented herein as the best mode for carrying out the invention, but that the invention will include all equivalents falling within the spirit and scope of the claims as well.

What is claimed is:

1. A method for monitoring structural data associated with a structure of a gas turbine engine, wherein the structure includes a reflective surface, the method comprising:
    positioning a sensor of a non-interference stress management system to monitor the structure, the sensor comprising:
        a light transmitting fiber;
        a transmit lens;
        a light receptive fiber; and
        a receive lens;
    determining a focal distance between the light transmitting fiber and the transmit lens, wherein the focal distance is selected to allow the transmit lens to focus light from the light transmitting fiber to form a focused transmit beam, the transmit beam targeting the reflective surface;
    positioning the light transmitting fiber and the transmit lens, wherein the light transmitting fiber and the transmit lens are separated by a transmit gap based on the focal distance; and
    positioning a light receptive fiber and a receive lens to receive a focused reflected beam from the reflective structure, wherein the light receptive fiber is separated from the receive lens by a receive gap based on the focal distance.

2. The method of claim 1, wherein the reflective structure is a rotating airfoil of the gas turbine engine.

3. The method of claim 1, further comprising reporting the measured structural data to a local memory.

4. The method of claim 1, further comprising reporting the measured structural data to a ground based memory.

5. The method of claim 1, wherein the structural data is monitored during a flight cycle.

6. The method of claim 1, wherein the structural data is monitored during a test cycle.

7. A system for monitoring structural data associated with a structure of a gas turbine engine, wherein the structure includes a reflective surface, the system comprising:
    a sensor of a non-interference stress mana
    gement system configured to monitor the structure, the sensor comprising:
        a light transmitting fiber;
        a transmit lens having a focal distance between the light transmitting fiber and the transmit lens, the transmit fiber and the transmit lens being separated by a transmit gap based on the focal distance, wherein the focal distance is selected to allow the transmit lens to focus light from the light transmitting fiber to form a focused transmit beam, the transmit beam targeting the reflective surface;
        a light receptive fiber positioned to receive a focused reflected beam from the reflective structure; and
        a receive lens, positioned to receive a focused reflected beam from the reflective structure, wherein the light receptive fiber is separated from the receive lens by a receive gap based on the focal distance.

8. The system of claim 7, wherein the reflective structure is a rotating airfoil of the gas turbine engine.

9. The system of claim 7, further comprising a local memory configured to receive the measured structural data.

10. The method of claim 7, further comprising a ground based memory configured to receive the measured structural data.

11. The method of claim 7, wherein the structural data is monitored during a flight cycle.

12. The method of claim 7, wherein the structural data is monitored during a test cycle.

* * * * *